Figure 1:
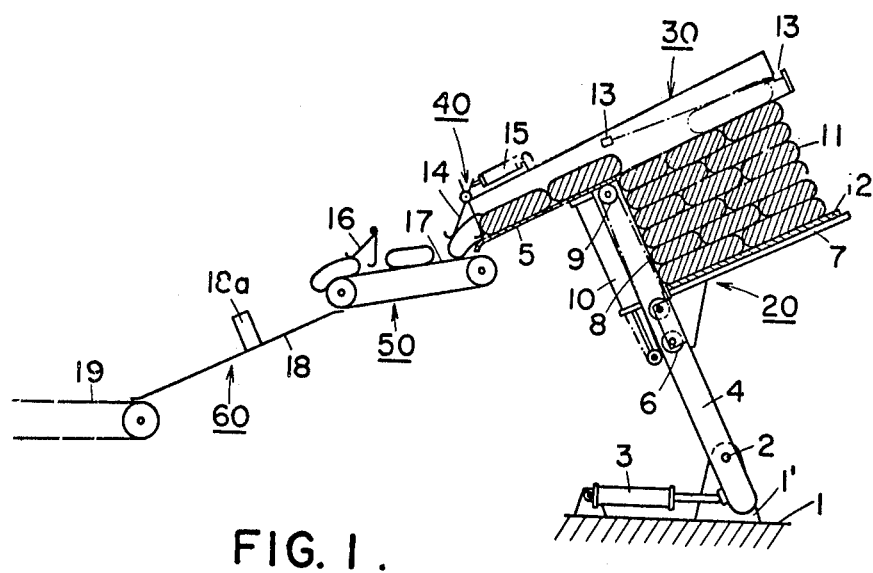

United States Patent [19]
Nishimura

[11] 4,106,635
[45] Aug. 15, 1978

[54] ELEVATABLE DEPALLETIZING SYSTEM

[75] Inventor: Matsuo Nishimura, Tokyo, Japan

[73] Assignee: Yasui Sangyo Co., Ltd., Fujinomiya, Japan

[21] Appl. No.: 769,776

[22] Filed: Feb. 17, 1977

[51] Int. Cl.² .............................................. B65G 59/02
[52] U.S. Cl. .................................. 214/8.5 A; 221/290
[58] Field of Search ............. 214/8.5 R, 8.5 A, 8.5 G, 214/8.5 H, 8.5 B, 307; 221/288, 289, 292, 293, 290, 187, 9–14

[56] References Cited

U.S. PATENT DOCUMENTS

| 2,925,195 | 2/1960 | Faulkner | 221/289 X |
| 2,993,609 | 7/1961 | Enterline et al. | 214/8.5 A X |
| 3,616,951 | 11/1971 | St. Clari et al. | 214/8.5 A X |

FOREIGN PATENT DOCUMENTS

| 684,661 | 4/1964 | Canada | 214/8.5 R |
| 28,881 | 7/1957 | Finland | 214/8.5 A |
| 1,481,354 | 1/1969 | Fed. Rep. of Germany | 214/8.5 A |
| 178,954 | 4/1962 | Sweden | 214/8.5 R |
| 142,406 | 12/1961 | U.S.S.R. | 214/8.5 A |
| 501,952 | 4/1976 | U.S.S.R. | 214/8.5 A |

*Primary Examiner*—Frank E. Werner
*Attorney, Agent, or Firm*—Lackenbach, Lilling & Siegel

[57] ABSTRACT

A depalletizing system of depalletizing articles which have been stacked in layers and separating them one by one so that loading work of those articles onto trucks or freight cars can be carried out more easily and in a shorter time than when carried out manually. The system includes hoisting means comprising a tiltable mast and a loading table, a chute secured to the upper portion of the hoisting means substantially in parallel with the plane of each layer of the articles, control means for controlling the upward movement of the loading table, selecting means for blocking the passage of the articles whenever required, and separating means for separating them one by one. The system further includes means for arranging those articles in the same orientation. Accordingly, all work from depalletizing to conveying them onto trucks or freight cars can be completely mechanized.

12 Claims, 2 Drawing Figures

ELEVATABLE DEPALLETIZING SYSTEM

The present invention relates to a depalletizing system of the kind in which articles such as bags or boxes which have been stacked in layers on a pallet are automatically depalletized and the depalletized articles are separated one by one during their being conveyed so as to facilitate loading work of those articles onto trucks or freight cars.

Among the recent developments in material-handling machines, comparatively less developed may be mechanization of operations for depalletizing articles stacked up on a pallet, separating and loading them onto trucks or freight cars. Usually, palletized articles are temporarily stored in warehouses, and upon shipment they are manually unloaded and conveyed into trucks or the like one by one. This is primarily because, when being loaded on a pallet, they are often laid up in layers with each layer composed of articles arranged in plural rows and their arrangements are made different alternately to prevent stacked articles from collapsing. This manual depalletization naturally requires much labor and is time-consuming. Accordingly, it has long been sought to mechanize and systematize the depalletizing works so as to liberate workers from heavy manual labor and reduce the costs therefor.

Therefore, an object of the present invention is to provide a novel depalletizing system that may be useful in overcoming the above disadvantage.

The depalletizing system in accordance with the invention comprises hoisting means for hoisting up or down the palletized articles and tilting them at a required angle, a chute secured to the upper portion of the hoisting means substantially in parallel with the plane of each layer, control means for controlling the actuation of the hoisting means, selecting means for permitting only the passage of the articles included in one of the plural rows while blocking the passage of the articles of other rows, and separating means for separating one by one the articles issuing from the chute.

This system further includes orientation means for arranging the articles, which have been separated one by one by the separating means, in the same orientation.

Said hoisting means generally comprises a tiltable mast and a lift table slidably mounted on the mast. The control means is adapted to stop the upward movement of the table as soon as the lower surface of the uppermost layer comes to alignment with or slightly above the plane of the chute disposed at the upper portion of the mast. Thus, articles in the uppermost layer begin to slide down on the chute by their own weight or by further tilting the mast.

The selecting means provided at the free end of the chute includes at least one stopper, the number of which depends on in how many rows articles of each layer are arranged. This stopper, in case articles are arranged in two rows, is adapted to block the flow of the first-row articles while the second-row articles are sliding off the chute and permit the former's passage when the latter have all slid off.

Articles after their passages having been permitted are then segregated one by one by the separating means comprising an endless belt conveyor, and are rearranged in the same orientation by the orientation-arranging means. Thus, articles are successively conveyed at suitable intervals so that loading work onto trucks or freight cars can be done easily.

Figure 2:
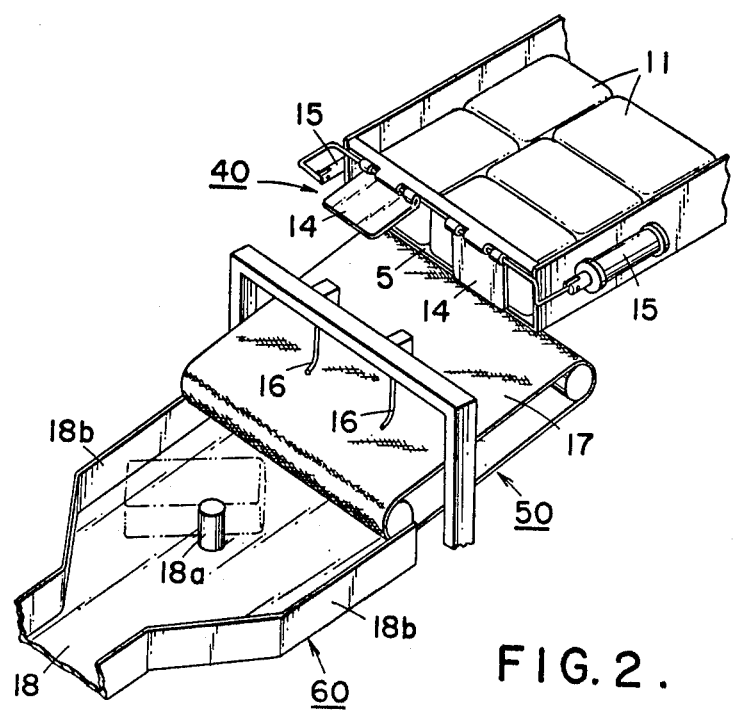

One of the preferred embodiments of the present invention will now be described in more detail, by way of example, with reference to the accompanying drawing, in which;

FIG. 1 is a schematical illustration of the depalletizing system of the present invention, and FIG. 2 is a partial top perspective view illustrating the invention.

In the drawing, the reference numeral 20 is generally indicative of hoisting means adapted to hoist up or down palletized articles. This means 20 substantially comprises a tiltable upright mast 4 and a lift table 7 slidably mounted on the mast 4. The mast 4 is pivoted to a bearing member 1' fixed to a base 1, the lower end of mast 4 being connected to a piston-cylinder device 3 also secured to the base 1 so that mast 4 can be tilted at a required angle. The sliding movement of the table 7 along the mast may be achieved, for example, by a piston-cylinder device 10 mounted on mast 4 on the opposite side of the table 7. In this respect, there are provided a roller member 6 rolling along mast and a sprocket wheel 9 at the top of mast, via which a chain 8 is extended between the roller member 6 and piston-cylinder device 10; thereby hoisting up or down lift table 7 along the mast. Alternatively, the piston-cylinder device may be secured to the lower portion of mast 4 so that, without use of the chain 8 and sprocket wheel 9, it can directly hoist the table 7. Indicated by the reference numeral 5 is a chute, which is secured to the upper portion of the mast 4.

When stacking articles 11 on a pallet 12, it is desirable to arrange them in plural rows for each layer and to differ their arrangement alternately so as to prevent stacked articles from collapsing. In FIG. 1, for example, each layer comprises two rows of articles; one of them being composed of longitudinally-oriented or lengthwise-arranged articles and the other being of three transversely-oriented or widthwise-arranged articles. Though their arrangement in each layer may, of course, vary according to the size of pallet 12 and each article 11, it is highly desirable to arrange them in plural rows, either lengthwise or widthwise, for each layer in any case.

Articles 11 thus stacked on pallet 12 are placed on lift table 7 by a fork lift truck, for example. In this instance, it is preferable to maintain the mast 4 at a vertical position, prior to actuating the piston-cylinder device 3 to tilt mast 4 at a required angle. Thereafter, another piston-cylinder device 10 is actuated, thereby hoisting up the palletized articles 11 on table 7 along the mast.

According to the present invention, there is provided control means, which is generally shown by the reference numeral 30, for controlling the actuation of piston-cylinder device 10. Said control means 30 is adapted to stop the upward movement of lift table 7 each time the latter moves up by the distance equal to the thickness of each layer. As such control means, for example, a photoelectric switch 13 or a micro switch may preferably be used. In FIG. 1 the photoelectric switch 13 is provided at the upper portion of the mast 4, so that when the lower surface of the uppermost layer of the articles 11 has moved up to be in alignment with or slightly above the plane of chute, the switch 13 is instantly actuated by the upper surface of the layer. The actuation of switch 13 stop the operation piston-cylinder device 10; thereby stopping the further upward movement of the lift table 7.

Then, articles 11 forming the uppermost layer begin to slide down off hoisting means 20 the chute 5 by their own weight or by further tilting the mast 4 and are fed toward selecting means provided at the free end of the chute 5. This selecting means 40 is adapted to select articles 11 which are sliding down in a group. Without such means 40, the smooth conveyance of articles would be prevented by collisions with each other since during their presence on chute 5 they are still arranged in plural rows as clearly shown in FIG. 2.

This selecting means 40, according to the invention, comprises stoppers 14 whose opening or closing is controlled by piston-cylinder devices 15. The number of stoppers 14 to be provided depends on in how many rows, articles of each layer are arranged. When they are arranged in two rows, for example, as shown in FIG. 2 of the drawing, there may be provided either one or two stoppers. In the case of two stoppers being provided, they are opened by the piston-cylinder devices 15 alternately so as to permit the passage of first-row articles and then the second-row articles. In other words, when the first-row articles have all slid off the chute 5 through the first stopper, the latter is closed and simultaneously the second stopper is opened to permit the second-row articles to slide off the chute 5.

Preferably, the alternate actuation of piston-cylinder devices 15 may be achieved by use of detecting means 16 such as limit switches adapted to detect the passage of the last article of each row through the corresponding stopper.

Thus, articles 11 are discharged in sequence with some of them longitudinally-oriented and other transversely-oriented, but they have not yet been completely separated one by one. If they were further fed forward under this condition, they might collide with each other and get messed up; which would cause a standstill of the articles and, in the worst situation or case, damage them.

In order to separate articles 11 issuing from chute 5, there is provided below the chute separating means 50 comprising, for example, an endless belt conveyor 17 whose rotational speed is slightly faster than the issuing speed of articles from the chute 5, so as to receive and separate them one by one. Other means, such as motor-driven rubber rollers, may also be utilized for separating them one by one, instead of the endless conveyor belt 17.

Articles 11 thus conveyed and separated by separating means 50 are then transmitted to orientation-arranging means 60, where they are rearranged in the same orientation. This means 60, as shown in FIG. 2, is tapered off or substantially fan-shaped and provided at the central portion of its bottom wall 18 with a free roller 18a rotatable about a vertical axis and with two side walls 18b, the distance between which is gradually narrowed. The shortest distance between the free roller 18a and either of the side walls 18b is wide enough for the lengthwise-arranged articles to pass through but not wide enough for the widthwise-arranged articles to passthrough. Accordingly, the widthwise-arranged articles, after sliding off separating means 50, run against the free roller 18a, whereby their orientations are changed to the lengthwise ones.

Articles of which orientations have been made same in this way are then conveyed by a conveyor 19 which is extended into trucks or freight cars.

At the same time when articles 11 forming the uppermost layer have been all discharged from the chute 5, lift table 7 moves up until the lower surface of the next layer becomes aligned with the plane of chute 5. In this respect, it is preferable to use the detecting members 16 disposed either on chute 5 or separating means 50 in order to detect that articles of each layer have been all discharged and actuate the piston-cylinder device 10, thereby hoisting lift table 7 until the next layer is detected by the control means 30.

Articles 11 now forming the uppermost layer slide off the hoisting means 20 onto the chute 5. Then, articles, maintaining their original arrangement on the chute 5, are selected according to the row by selecting means 40, and fed onto separating means 50 where they are separated one by one. After the separation, they are transmitted to fan-shaped means 60 so as to be rearranged in the same orientation, and conveyed into trucks or freight cars. This operation is repeated in the same manner as mentioned above until all articles 11 on pallet 12 are depalletized.

From the above descriptions thus far made, it will be understood that the depalletizing system of the present invention can make possible to realize total mechanization of depalletizing work, which would otherwise require much labor and time.

What we claim is:

1. A depalletizing system of the kind in which articles stacked up in layers on a pallet, each layer being composed of articles arranged in plural rows, are automatically depalletized, said system comprising;
   (a) hoisting means adapted to hoist up or down said palletized articles and tilt them at a required angle,
   (b) a chute secured to the upper portion of said hoisting means substantially in parallel with the plane of each layer,
   (c) control means adapted to stop the further upward movement of the palletized articles when the lower surface of the uppermost layer has been located in alignment with or slightly above the plane of said chute,
   (d) selecting means adapted to permit only the articles included in one of the plural rows to pass while blocking the passage of the articles in other rows, and
   (e) separating means adapted to separate the articles issuing from said selecting means in order to put a suitable interval between the two adjacent articles.

2. A system according to claim 1, further including orientation means for arranging the articles, which have been separated by said separating means, in the same orientation.

3. A system according to claim 2, said orientation means is of a generally inverted fan shape and comprises two side walls, a bottom wall and a free roller; said free roller being disposed in a vertical position with respect to said bottom wall at the central portion thereof; and the shortest distance from said free roller to either of said side walls being wide enough for the lengthwise-arranged articles to pass but not wide enough for the widthwise-arranged articles to pass.

4. A system according to claim 1, wherein said hoisting means substantially comprises a tiltable mast and a lift table; and said lift table being slidably mounted on said mast and adapted to receive said palletized articles.

5. A system according to claim 4, wherein the sliding movement of said lift table along the mast being achieved by a piston-cylinder device.

6. A system according to claim 1, wherein said control means comprises a photoelectric switch disposed at the top portion of the hoisting means.

7. A system according to claim 1, wherein said selecting means comprises at least one stopper of which opening or closing is effected by a piston-cylinder device.

8. A system according to claim 7, wherein said piston-cylinder device is actuated by a detecting member which is adapted to count the number of the articles that have slid off the chute.

9. A system according to claim 8, wherein said detecting member also actuates the piston-cylinder device for the lift table when the article forming the uppermost layer have all slid off the chute.

10. A system according to claim 9, wherein said detecting member comprising a limit switch disposed on the chute.

11. A system according to claim 9, wherein said detecting member comprising a limit switch disposed above said separating means.

12. A system according to claim 1, wherein said separating means comprises an endless conveyor belt of which rotational speed exceeds the issuing speed of the articles from the chute.

* * * * *